United States Patent

[11] 3,525,302

[72] Inventors Harry C. Eberly
Narvon, Pennsylvania;
Raymond E. Fisher, New Holland,
Pennsylvania
[21] Appl. No. 734,005
[22] Filed June 3, 1968
[45] Patented Aug. 25, 1970
[73] Assignee Sperry Rand Corporation
New Holland, Pennsylvania
a corporation of Delaware

[54] STEP-UP DRIVE FOR A BALING MACHINE
5 Claims, 4 Drawing Figs.
[52] U.S. Cl............................................................ 100/179,
56/341
[51] Int. Cl................................................................ A01f 15/10
[50] Field of Search........................................ 100/100,
141, 142, 143, 179-192; 56/341, 364

[56] References Cited
UNITED STATES PATENTS
| | | | |
|---|---|---|---|
| 2,038,809 | 4/1936 | Tallman et al. ............... | 56/364 |
| 2,352,388 | 6/1944 | Jones........................... | 100/100 |
| 2,929,313 | 3/1960 | Luthman et al............... | 100/142 |

*Primary Examiner*—Edward L. Roberts
*Attorney*—Joseph A. Brown and John E. Becker ABSTRACT: A step-up drive for a baling machine to increase the operating speed of the baler using a belt drive which is disposed between a tractor power take-off and the baler flywheel.

Patented Aug. 25, 1970

INVENTORS
HARRY C. EBERLY
& RAYMOND E. FISHER

BY
*Joseph A. Brown*
ATTORNEY

INVENTORS
HARRY C. EBERLY
& RAYMOND E. FISHER

BY Joseph A. Brown
ATTORNEY

STEP-UP DRIVE FOR A BALING MACHINE

BACKGROUND OF THE INVENTION

This invention relates generally to drive systems for baling machines, and specifically to a belt step-up drive for a baling machine which is located between a tractor power take-off input and a baler flywheel.

Many farmers now rely to a large extent on mechanized farm machinery for help in economically and efficiently harvesting their crops and preparing them for storage or market. An example of a machine which has been evolving over the years to provide the farmer with a more effective machine is the automatic hay baler. Many farmers have expressed a desire for a faster and more effective machine which will maintain the reliability of operation of presently available balers. The speed of the plunger reciprocating in the machine bale case is, however, a limiting factor in how fast a baler can complete an operation. Hay balers of the future may need baling speeds in excess of one hundred strokes of the plunger per minute. Presently available balers operate in a speed range of sixty to eighty strokes per minute.

The hay baler, such a shown in U.S. Pat. No. 2,981,046 or pending application Serial No. 664,685, filed August 31, 1967, assigned to the present assignee, includes a bale case, in which a bale is formed by the reciprocation of a plunger therein, a flywheel disposed forwardly of the bale case and a gear box disposed rearwardly of the flywheel. The flywheel is driven by a conventional power take-off connection and, in turn, the kinetic energy of the flywheel plus a driving force supplied directly by the power take-off connection is transferred to the gear box to power the baler.

A present problem being tackled by farm machinery manufacturers is how to increase the speed of presently available baling machines to achieve this high plunger stroke rate without having to incur expenditures of both time and necessary manpower to redesign standard gearboxes and flywheels. It has already been found it would be necessary to increase the flywheel to approximately two and one half times its size to achieve the necessary kinetic energy to drive a conventional baler at one hundred strokes per minute using a conventional tractor power take-off producing a rotating out-put of about 540 r.p.m. Similarly, the pinion gear of the standard baler gearbox could be redesigned, increasing its size, to achieve the desired speed. In both cases, the increase in size, by a factor of approximately two to three, would be prohibitive from the standpoint of overall baler size. Neither the larger flywheel, nor the enlarged pinion would be adaptable to the dimensional specifications of presently available balers, since the dimensional characteristics must, among other things, take into consideration the standard widths, such as the widths of field gates.

In any speed increasing procedure it would be highly desirable to keep as near as possible an optimum straight line design arrangement of the tractor power take-off drive element and the baler drive input shaft, which is usually symmetrically disposed with respect to the flywheel mounted on the front of the bale case. Such a straight line arrangement positions the tractor further outside the baler away from the windrow which is being picked up and baled.

SUMMARY OF THE INVENTION

Accordingly, the present invention provides a suitable means whereby the baler plunger speed is capable of being increased to speeds in excess of one hundred strokes per minute using a belt step-up drive between the tractor power take-off shaft and the flywheel which negates the need for an increase in flywheel or pinion size, while at the same time providing an in-line tractor-baler connection permitting the tractor to be moved to the left away from the windrow being picked up by the baler.

DESCRIPTION OF PREFERRED EMBODIMENT

Figure 1:
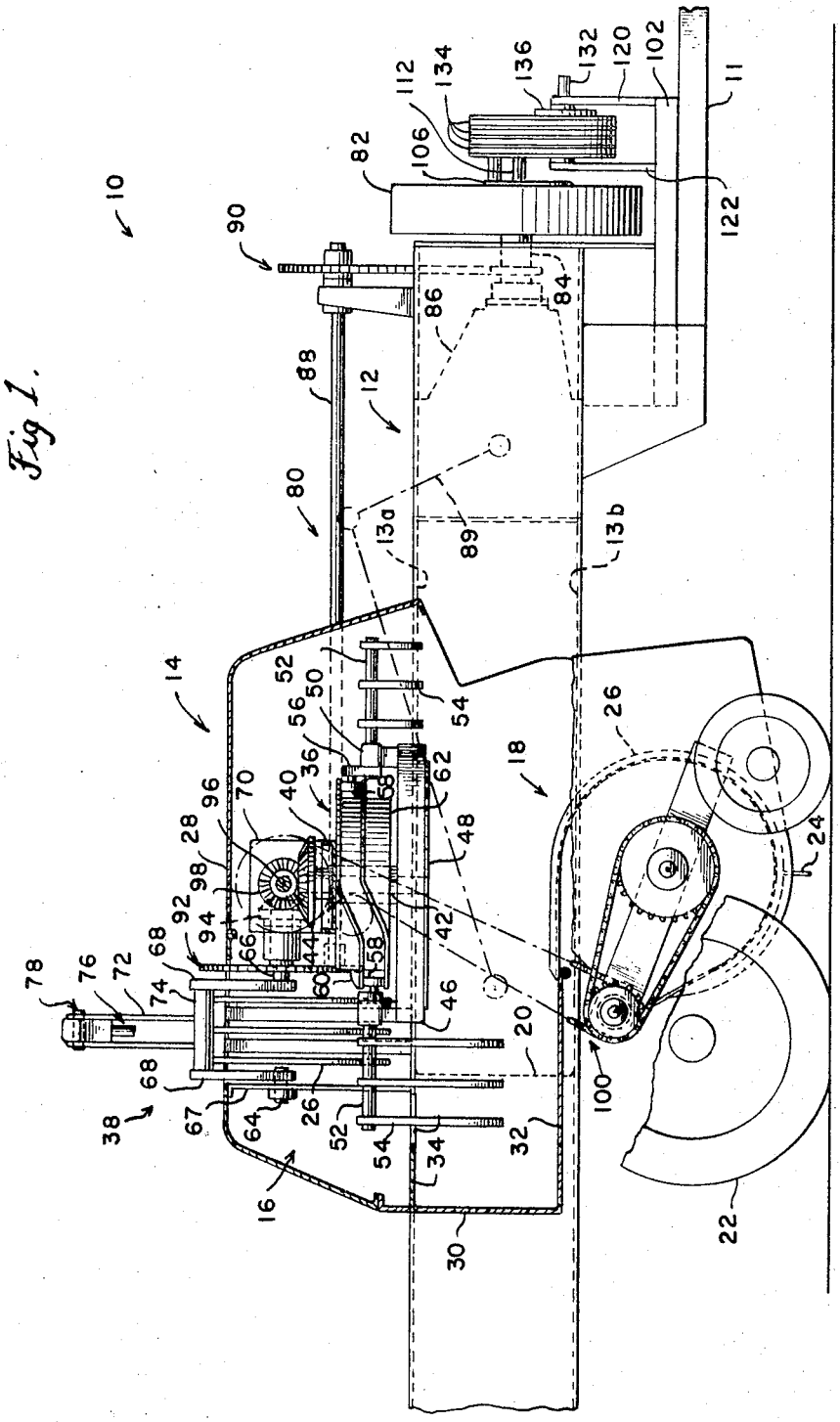
FIG. 1 is a side elevation view of a baling machine having the proposed drive system installed thereon.

Referring now to a hay baling machine, shown generally in FIG. 1, designated by the numeral 10, and comprised of a tongue 11, extending forwardly of the baler for attachment to a tractor (not shown), a bale case 12, extending in a fore-and-aft direction, a feeder housing 14, a feeding mechanism 16 adapted to convey crop material into the bale chamber, and a rotatable pick-up 18 which lifts crop material from the ground and delivers it to the feeding mechanism. A plunger 20, indicated diagrammatically by a dashed line in FIG. 1, is mounted for reciprocable movement in bale case 12. The baler 10 is mounted on wheels 22 for movement through a field behind a tractor, or the like. A drive system 80, which will be hereinafter described in detail, furnishes power to the baler components and is in turn driven by a tractor power take-off, not shown.

The rotatable pick-up 18, shown in FIG. 1, includes a plurality of rows of circumferentially spaced pick-up fingers 24 which engage the crop material as the baler moves over the ground and move it upwardly and rearwardly to the feeding mechanism. The fingers 24 are separated by laterally spaced stripper members 26.

The feeder housing 14 extends over rotatable pick-up 18 and the feeding mechanism 16, and comprises a roof portion 28, a vertically extending wall portion 30, a floor 32 and an outboard side wall (not shown). A horizontal plate 34 in the rear section of the feeder housing serves to confine the material as it is being conveyed toward the bale case 12.

The feeding mechanism 14 is comprised of a rotary feed unit 36 which moves crop material from the outboard side of the baler inwardly toward the bale chamber to an orbiting feed unit 38 which conveys material to the bale chamber.

Rotary feed unit 36 is carried on a transversely extending support member 44. A vertically extending shaft 42 is journalled in support member 44 at its upper end. A heavy frame member 46 and a circular plate 48, fixed to frame 46, form part of a feed finger carrier (not shown) which is adapted to prevent crop material from getting into the feed unit drive mechanism. At each end of frame 46 there is provided a support element 50 which support carries a rockshaft 52. A plurality of feed fingers 54 are fixed to each rockshaft 52 and the angular position of the fingers 54 is regulated through crank arm 56 fixed at one end to the rockshaft as shown in FIG. 1. A roller 58, mounted at the opposite end of rockshaft 52, is adapted to run in a cam track 60 which is carried on cylindrical support 62 fixed to support 40.

Feeder unit 38, shown in FIG. 1, comprises a pair of crank shafts 64 and 66 journalled respectively in a vertical wall 67 and gearbox 70. A crank element 68 is mounted on each end of shafts 64 and 66. Upwardly extending packer arms 72 are fixed to a hub 74 pivotally mounted on crank pin 78 which joins the outer radial ends of crank 68.

The feeding mechanism 16 is driven by a drive system 80 which comprises a flywheel 82 operatively connected to a tractor power take-off, not shown. A connecting shaft 84 extends rearwardly of flywheel 84 to a gearbox 86 mounted in side wall 13d of the bale case. A longitudinally extending main drive shaft 88 is carried on top wall 13a of the bale case and is connected to shaft 84 by a chain and sprocket drive 90.

The drive shaft 88 transfers power through a sprocket (not shown) carried at the rearward end thereof, through chain and sprocket drive 92 to gearbox 70 via shaft 66. The shaft 66 furnishes power to gearbox 70 through a bevel gear (not shown), which, in turn, meshes with a bevel gear 94 carried on cross shaft 96. Cross shaft 96 drives the rotary feed unit through a bevel gear 98 which meshes with gear 44. At its outboard end, the cross shaft 96 supplies power to pickup 18 through a chain drive 100.

The gearbox 86 drives a linkage 89, shown diagrammatically in FIG. 1, which linkage is connected to plunger 20. Since all the driven mechanisms are supplied with power through the power take-off and flywheel, their operating speeds will be determined thereby. In order to provide a speed step up without increasing the size of the flywheel or the pinion in gearbox 86 a belt drive speed step-up arrangement is mounted forwardly on baler 10 as shown in FIGS. 1 through 4.

Figure 4:
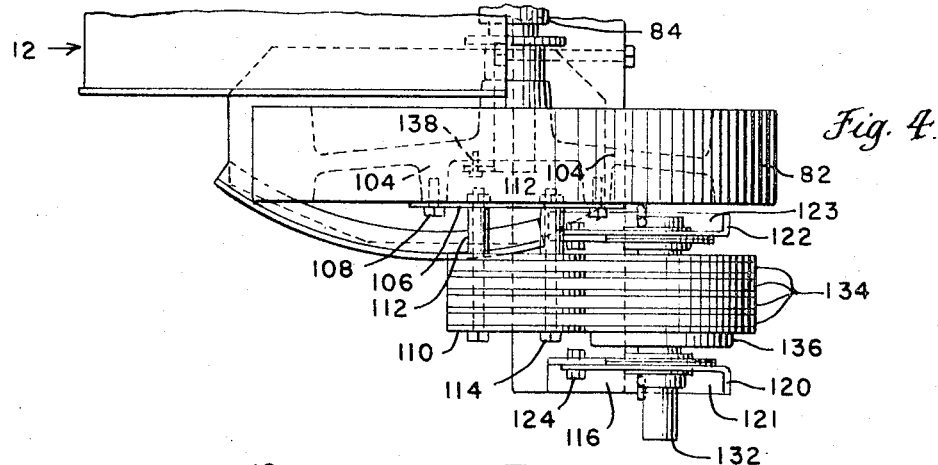
FIG. 4 is a fragmentary enlarged top view of the drive system constructed in accordance with the present invention.
Figure 2:
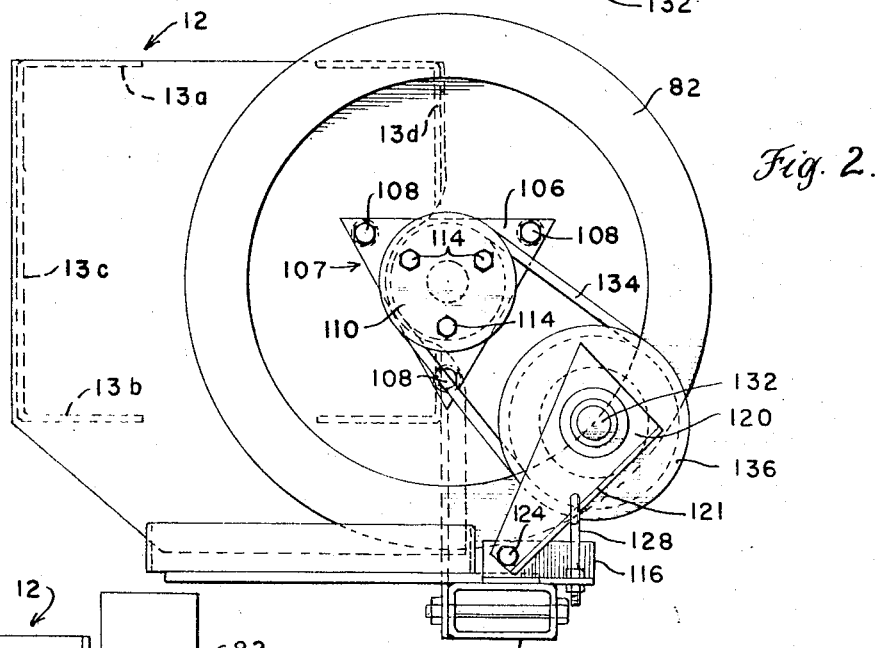
FIG. 2 is an enlarged plan view of the baler and drive system shown in FIG. 1.
Figure 3:
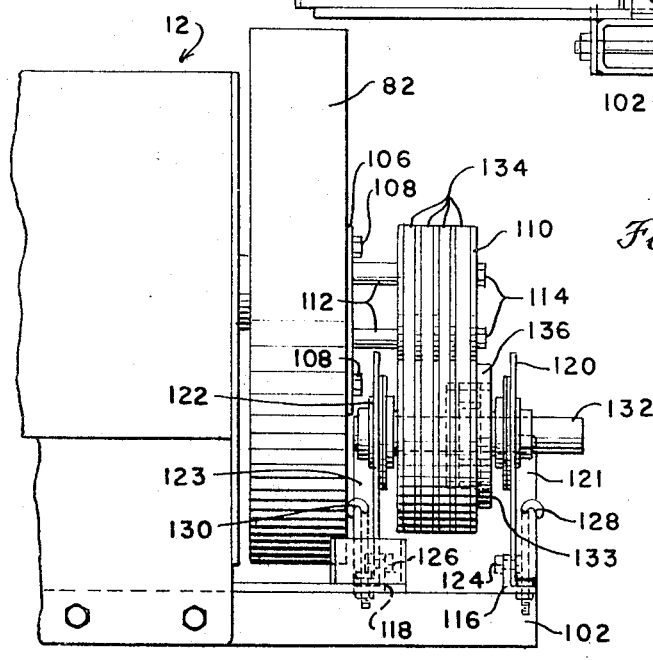
FIG. 3 is a fragmentary enlarged side elevation of the proposed drive system.

Referring now specifically to FIGS. 2, 3 and 4, a frame member 102 extends forwardly of baler 10. The flywheel 82 is provided with a plurality of bosses 104, symmetrically arranged with respect to the axis of the flywheel, which are adapted to receive mounting means 107 for a sheave 110, disposed forwardly of flywheel 82.

The mounting means 107 is comprised of a plate member 106 which is fixed to the flywheel bosses 104 by bolts 108, spacers 112 disposed between plate 106 and sheave 110, and bolts 114 which extend inwardly through sheave 110, through spacers 112 to the plate 106, fastening the sheave to the flywheel for rotation therewith.

Mounting brackets 116 and 118 are suitably secured by means not shown to the frame member 102 such that one end of each of the L-shaped brackets extend laterally outwardly of the frame, as shown in FIG. 2. To each mounting bracket 116, 118 there is pivotally affixed a bearing bracket 120, 122 respectively. The pivotal connecton is accomplished by means of bolts 124 and 126 which extend through a suitable aperture in the brackets 120, 122 and the upstanding legs of the mounting brackets 116, 118.

Each of the brackets 120, 122 is provided with a flanged portion 121, 123, respectively, which extends transversely outwardly from the bracket. The generally triangular shaped brackets extend upwardly and outwardly from the brackets 116, 118, as seen in FIG. 2. A drive shaft 132 is suitably supported in the upper portion of the bearing brackets 120, 122 for rotation with respect thereto. The flanged portions 121, 123 of the brackets 120, 122 are provided with suitable apertures therein to receive one end of the eye bolts 128 and 130 respectively. The other ends of the bolts are received in suitable apertures provided in brackets 116, 118 respectively as illustrated in FIG. 2. The function of the eye bolts will hereinafter be described.

The rotatable shaft 132 is adapted to have mounted thereon a drive sheave 136. A conventional overrunning clutch 133 shown in FIG. 3 is also disposed on shaft 132 and is adapted to disengage sheave 136 from shaft 132 when tractor power is disengaged from the input shaft allowing the kinetic energy in the flywheel to dissipate. In this way the reverse torque will not be transmitted to the tractor transmission drive train.

A plurality of V-belts 134 provide a driving connection between the drive sheave 136 and sheave 110. The belts are also adapted to be used in place of a conventional slip clutch under severe overloading conditions on the plunger to damp the peak torque loads developed at the flywheel shear bolt 138. In this manner, the belts 134 greatly reduce the number of shear bolt failures without overloading the main drive gearbox. As will be understood by those skilled in the art, driving power for the baler is provided from a suitable power source, such as a conventional tractor power take-off (not shown) which is connected to shaft 132 at the forward end thereof. Conventionally, the power take-off provides a rotational power input of 540 r.p.m. which is used to power the baling machine at 60 to 80 strokes per minute of the plunger. Since the sheave 136 is driven directly from shaft 132 and its diameter is larger than that of sheave 110, there is a step-up in rotational speed transferred from the PTO to the flywheel. Using the present belt drive between the power take-off and the baler flywheel the rotational power input may be increased so the plunger speeds in excess of 100 strokes per minute are achieved.

The eye bolts 128 and 130 are adapted to keep a constant tension on the belts 134 during the operation of the machine. They also allow easy adjustment of the belts as they encounter normal wear.

While this invention has been described in connection with a particular embodiment thereof, it will be understood that it is capable of further modification and this application is intended to cover any variations, uses, or adaptations of the invention, following in general, the principles of the invention, and including such departures from the present disclosures as come within known or customary practice in the art to which the invention pertains, and as fall within the scope of the invention as the limits of the appended claims.

We claim:
1. A drive for a baling machine comprising, in combination:
 a frame member;
 a bale case mounted on said frame;
 a flywheel rotatably mounted in front of said bale case; and
 a step-up drive means mounted forwardly of said flywheel on said frame, said step-up drive means including a first rotatably mounted sheave drivingly interconnected to a second sheave connected to said flywheel and rotatable therewith.

2. A drive for a baling machine as described in claim 1, wherein said step-up drive means further includes:
 a bracket means mounted on said frame member;
 bearing means pivotally connected on said bracket means;
 tensioning means connecting said bracket means and said bearing means;
 a shaft rotatably supported in said bearing means, said first sheave being mounted on said shaft;
 mounting means connected to said flywheel and extending forwardly therefrom, said second sheave being connected to said flywheel through said mounting means; and
 means for drivingly interconnecting said first and second sheaves.

3. A drive for a baling machine as described in claim 2, wherein said first sheave is larger in diameter than said second sheave, said first sheave is driven directly from a power source, while said second sheave is driven directly from said first sheave.

4. A drive for a baling machine as described in claim 2, wherein said mounting means is comprised of:
 a plate connected to said flywheel; and
 a plurality of bolts having spacers thereon connected to and extending outwardly from said plate to receive said second sheave and connect said second sheave in a spaced relation from said flywheel.

5. A drive for a baling machine as described in claim 2, wherein said step-up drive means is comprised of:
 a pair of L-shaped spaced apart brackets mounted on said frame member;
 a pair of spaced apart bearing plates pivotally connected by one end thereof to said spaced apart brackets;
 a tension bolt connected by one end to each of said bearing plates intermediate the ends thereof and by the other end to said spaced apart brackets; and
 a shaft rotatably supported in said bearing plates, said first sheave rotatably connected to said shaft between said bearing plates;
 mounting means connected to said flywheel and extending outwardly therefrom;
 said second sheave of smaller diameter than said first sheave rotatably connected to said flywheel in spaced relation therefrom by said mounting means; and
 an endless belt driving connecting said first and second sheaves, whereby increased rotational speed of said flywheel is achieved when said baling machine is driven from a power source through said first sheave to said second sheave.